United States Patent
Carstensen

(10) Patent No.: US 7,535,187 B2
(45) Date of Patent: May 19, 2009

(54) LINEAR TRAVERSING CARRIAGE INCORPORATING AN AIR GAP INDUCTIVE MOTIVATOR

(75) Inventor: Peter T. Carstensen, Adirondack, NY (US)

(73) Assignee: Kadant Inc., Acton, MA (US)

( * ) Notice: Subject to any disclaimer, the term of this patent is extended or adjusted under 35 U.S.C. 154(b) by 133 days.

(21) Appl. No.: 11/705,994

(22) Filed: Feb. 14, 2007

(65) Prior Publication Data
US 2007/0200514 A1  Aug. 30, 2007

Related U.S. Application Data

(60) Provisional application No. 60/774,030, filed on Feb. 16, 2006.

(51) Int. Cl.
H02P 1/00 (2006.01)
(52) U.S. Cl. .......................... 318/135; 226/92; 101/216
(58) Field of Classification Search ................. 318/135; 226/92; 101/216
See application file for complete search history.

(56) References Cited

U.S. PATENT DOCUMENTS

| | | | |
|---|---|---|---|
| 4,598,238 A | | 7/1986 | Scarano |
| 4,641,065 A | * | 2/1987 | Shibuki et al. ............... 318/135 |
| 4,701,242 A | | 10/1987 | Scarano et al. |
| 4,800,818 A | * | 1/1989 | Kawaguchi et al. ......... 104/290 |
| 5,606,205 A | | 2/1997 | Defontaine et al. |
| 5,852,949 A | | 12/1998 | Cartensen |
| 5,947,361 A | * | 9/1999 | Berger et al. .................. 226/92 |
| 6,215,260 B1 | | 4/2001 | Hinds |
| 6,661,125 B2 | * | 12/2003 | Itoh et al. ...................... 310/12 |
| 6,809,434 B1 | * | 10/2004 | Duncan et al. ................ 310/12 |
| 6,965,176 B2 | * | 11/2005 | Hsiao ............................ 310/12 |
| 6,975,086 B1 | * | 12/2005 | Honda et al. ................ 318/560 |
| 6,984,945 B2 | * | 1/2006 | Sato ........................... 318/135 |
| 6,995,528 B2 | * | 2/2006 | Sato ........................... 318/135 |

(Continued)

FOREIGN PATENT DOCUMENTS

EP  0 762 255 A  3/1997

(Continued)

OTHER PUBLICATIONS

International Search Report issued by European Patent Office on Jul. 3, 2007 for corresponding international application PCT/US2007/003748.

*Primary Examiner*—Bentsu Ro
*Assistant Examiner*—David S Luo
(74) *Attorney, Agent, or Firm*—Frommer Lawrence & Haug LLP; Ronald R. Santucci

(57) ABSTRACT

The present invention relates to a linear traversing carriage for use in the papermaking industry and the like, which incorporates an air gap inductive motivator and eliminates all mechanical devices between the electrical power supply and the traversing mechanism. Specifically, the present invention relates to a linear traversing device comprising an inductor type linear motor comprising an electrical stator winding, a conductive platen extending over an entire traverse length of the device, a ferromagnetic material affixed to said conductive platen, a support means for supporting the device and maintaining an air-gap between the stator winding and the conductive platen, a user selected feed forward velocity map for driving the device, a controller that controls a movement of the device according to the user selected feed forward velocity map.

10 Claims, 2 Drawing Sheets

U.S. PATENT DOCUMENTS

2002/0022905 A1  2/2002  Erlanoen et al.
2003/0056666 A1*  3/2003  Krueger et al. .............. 101/216
2003/0184248 A1*  10/2003  Muroi et al. ................ 318/466

FOREIGN PATENT DOCUMENTS

EP     1 148 398 A   10/2001
FR     2 687 862 A   8/1993

* cited by examiner

_US 7,535,187 B2_

LINEAR TRAVERSING CARRIAGE INCORPORATING AN AIR GAP INDUCTIVE MOTIVATOR

CROSS-REFERENCE TO RELATED APPLICATIONS

This application claims priority benefits from U.S. Provisional Patent Application Ser. No. 60/774,030 filed Feb. 16, 2006 entitled "Linear Traversing Carriage Incorporating a Air Gap Inductive Motivator", the entire disclosure of which is incorporated herein by reference.

INTRODUCTION

1. Field of the Invention

The present invention relates to a linear traversing device and mechanism for use in the papermaking industry and the like. The device comprises an air gap inductive motivator, thereby eliminates all mechanical elements between an electrical power supply and the traversing mechanism. The invention also relates to a linear servo motor that drives the linear traversing device, and a program that controls the motion of the device.

2. Background of the Invention

Single axis traversing mechanisms are built within support structures that convey process applications or measurement devices across the web in processes such as papermaking, nonwoven production, steel rolling and a multitude of other processes producing sheet type materials. In the papermaking process, cross web traversing devices carry high pressure water jets to clean the serpentine belt material used to convey the paper sheet through the press and/or dryer section(s) of the papermaking machine. Products with trade names Pro-Jet, Scan-Jet, Thermo-Jet, Acc-Jet, ROBO-Jet are a few of these type of devices.

U.S. Pat. No. 5,852,949 to Cartensen, whose teachings are incorporated herein by reference, relates to a method of driving the movable portion of this type of device longitudinally the help of a support structure. Patent '949 relates to a linear traversing apparatus that comprises a segmented screw traversing mechanism for supporting devices across spans in papermaking machines. However, in this system, the rotation of the spanning nut is inhibited typically by mechanical communication with an instrument or other device which is engaged by a rail or slot parallel to the longitudinal axis of rotation of the lead screw. This requires both, maintenance of mechanical parts and also their frequent replacement due to their wear in harsh environments.

Controlling the motion or velocity, and direction is also critical in these devices, so that web motion and the traversing element's motion remain coordinated. In the papermaking art, showers are used to rewet the paper web or to clean and condition the fabric or wire after the sheet has passed therefrom or to clean rolls or moulds during their operation. Such showers typically span the cross machine direction of the machine above the fabric or rolls to accomplish this purpose.

A device of this nature is disclosed in U.S. Pat. No. 4,701, 242, which involves the use of a shower head mechanism that is supported by a housing having a track and trolley spanning the width of the web. The trolley is moved along the track by the motor and a shower head which extends through the housing is carried along by the trolley. The drawback of this device is that the whole system is mechanically driven and thus lacks both efficiency and readiness of operation.

Other mechanisms for moving water jets across a web involve the use of oscillating ball and screw arrangements, through which the shower is supported and its movement regulated; such as that disclosed in U.S. Pat. No. 4,598,238.

While these devices provide satisfactorily, it is desirable to provide a more simplified mechanism to support and move the water jet and at the same time is efficient and avoids any type of maintenance of mechanical parts and their wear and tear thereof. This is especially true in situations where the water jet traverses a long span on the papermaking machine.

More common method(s) of mechanically displacing the element within these devices employs chain and sprocket drives, rack and pinion gear, threaded shafts with follower nut, cable and pulley drives, and air or hydraulic piston/cylinder. All of these methods convert electrical energy to mechanical action. This involves converting an electric motor's rotating force into a bi-directional linear motion of the moving element, which requires numerous mechanical parts which are prone to failure. As the environmental conditions become more hostile due to extreme heat, moisture, and chemicals, this type of equipment becomes more failure prone. The present invention presents a solution to elimination of mechanical devices between electrical power and bi-directional linear motion of the moving element.

The present invention is directed to a linear traversing carriage which overcomes the shortcomings of the prior art described above. The present invention can also find applications in wet end and dry end tailcutters on a papermaking machine using water or a rotary knife or conventional knife for cutting the fabric, traversing dust doctors, traversing doctor systems using a short blade that is controlled to clean specific areas of a roll surface, traversing measurement systems e.g. to measure the coating thickness on a Yankee surface, traversing brush doctors for a dryer application; which instead of being full width can be used with a shorter brush that would traverse across the roll surface of the belt, or in traversing sheet cutters for a reel turn-up device. Other applications involve; chemical spray application, web sensing instrumentation, stock tail cutting and other tasks requiring unobstructed movement across a paper machine web that require a >1000:1 range velocity profile.

The drive disclosed herein controls a motor that is mounted on a linear track that incorporates within its design, a laminated conductor in an inductive plate as a reactive motivator to the motors induced field current. The reactive magnetic force allows controlled movement of the follower roller supported carriage. Positioning is ensured by carriage mounted transducer that has better than 0.0003 inch resolution. The application is mounted on the carriage mounting plate that is also a part of the traversing motor.

The present invention, has particular applications in controlling the movement of a linear shower, traversing motor, traversing beam shower or instrument carrier. These devices may be used in a variety of different applications, such as:

A shower, which cleans the serpentine fabric that conveys paper through a paper machine by oscillating back and forth while spraying it with high pressure water.

A single point instrument carrier (mounted on the carriage), which may be used to oscillate back and forth while monitoring the production process output.

A traversing (single point) shower, which is designed to treat the entire width of fabric (cross machine) with one source that is moved the entire machine width.

A dual, triple, quadruple and quince traversing beam, which has multiple motor/carriages traversing on one common inductive rail.

SUMMARY OF THE INVENTION

The present invention relates to a linear traversing device for use in the papermaking industry and the like. The device comprises an air gap inductive motivator, thereby eliminating all mechanical elements between the electrical power supply and the traversing mechanism.

It is an object of the instant invention to control the motion or velocity and direction of the moving element of the linear traversing carriage or the linear motor that runs that linear traversing carriage so that web motion and the traversing element's motion remain coordinated.

It is a further object of the invention to minimize heating of the stator winding as well as the current values used to drive the moving element.

It is another object of the invention to avoid any extraneous currents that would be supplied to the winding of the electrical stator winding of the motivator that will result in the undesirable heating, due to resistive copper losses, when operating at extremely low velocities.

It is yet another object of the invention to eliminate maintenance of mechanical parts and also their frequent replacement due to their wear in harsh environments.

BRIEF DESCRIPTION OF THE DRAWINGS

The following detailed description, given by way of example and not intended to limit the present invention solely thereto, will best be appreciated in conjunction with the accompanying drawing, wherein like reference numerals denote like elements and parts, in which.

The description of the various elements of the invention will be discussed in detail in the following sections.

DETAILED DESCRIPTION OF THE PREFERRED EMBODIMENTS

Figure 1:
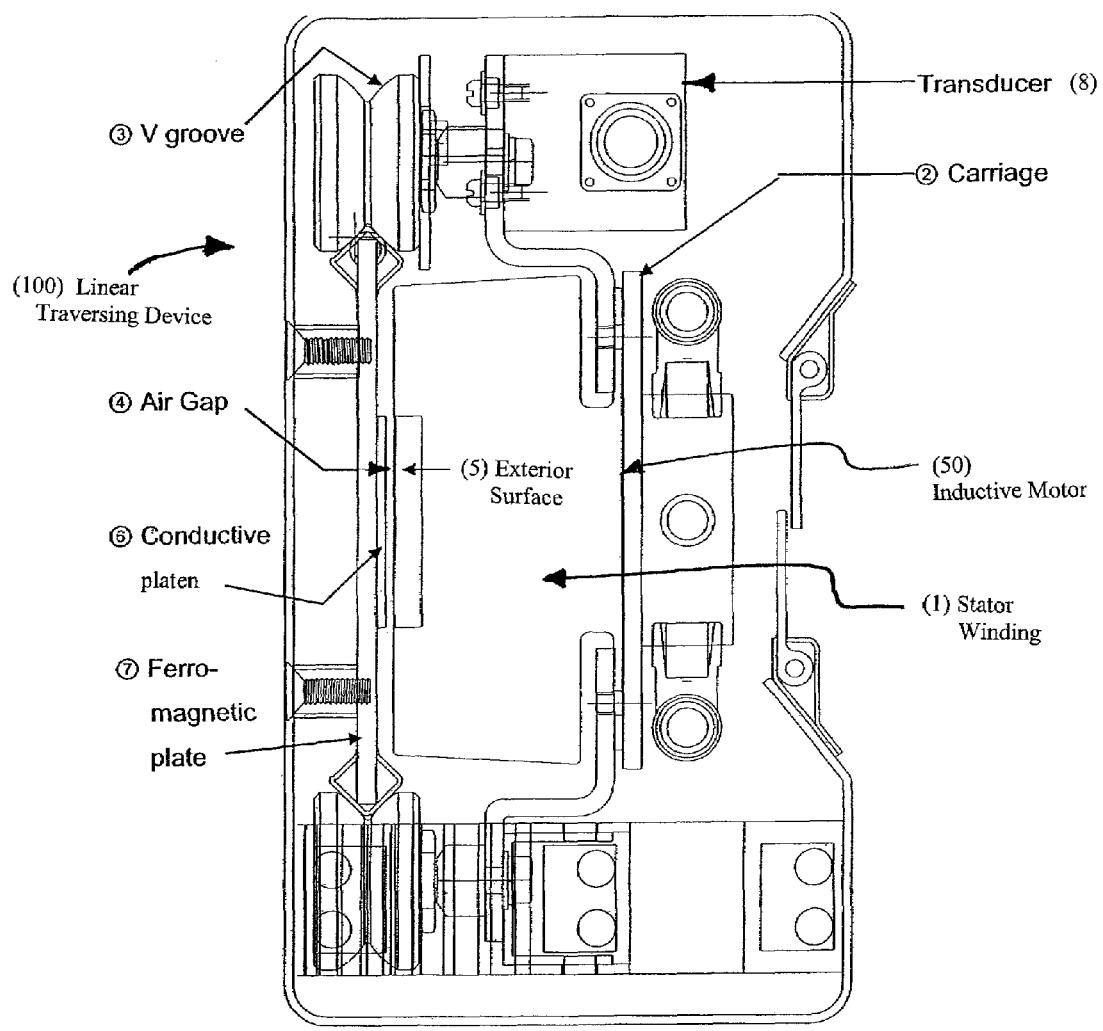
FIG. 1 is a top cross-sectional view of a linear traversing device, according to one aspect of the present invention.

FIG. 1 is a top cross-sectional view of the linear traversing device 100 comprising an air gap inductive motor 50, according to one aspect of the present invention. FIG. 1 shows a flat electrical stator winding (1) (hereinafter referred to as the "motivator") within the inductive motor 50, which is mounted on a rolling type carriage (2), which is herein referred to as the "element". The "V" groove type rollers (3) mounted on the carriage (2) maintain a specific non-contact "air gap" (4) between the exterior surface (5) of the internal slotted structure of the primary block of the winding of the stator (1) and a conductor "platen" (6) extending over the entire traverse length of the linear traversing device, having a specific geometry and made of a specific material known in the art. The conductive platen (6) is affixed to a ferromagnetic platen (7), which also extends over the entire traverse length of the linear traversing device and has a specific geometry and material composition well known in the art.

When alternating current ("AC") is applied to the stator winding (1) of the inductive motor 50, the resulting alternating magnetic field generated by the stator winding (1) induces an electrical flow within the conductor affixed to the platen (6). This induced current flow in the conductor platen (6) creates its own secondary magnetic field which reacts to the primary magnetic field generated by the winding (1). The platen (6) assembly is to be considered "mechanically ground" and the reactionary force between the platen (6) and the stator winding (1) causes the element (2) to move. By controlling the phase angle, current, voltage and pulse width of the electrical supply to the stator winding (1), directional control, velocity and force of the movable element (2) is possible.

Though very high linear velocities are easily obtained (16,000+inch/min), controlling this inductive carriage at low velocities requires very high resolution electrical power manipulation. Misapplication of power at low velocities will result in "unnecessary energy" being supplied to the field to over come the highly variable coulomb torque values that exist as a large variable "absorbed" force portion of motion considerations at these low velocities. To minimize heating of the stator winding, current or amperage values should be at the minimum. Any "extra" current supply to the winding will result in undesirable heating of the motivator.

Understanding the effects of variable external forces of such high dynamics in comparison to the actual force required for the application will bring an appreciation of the control algorithm required for constant velocity motion of the carriage at low speeds, which is an important feature of the instant invention.

In typical applications, low speed should be considered as any speed that is less than $1/100^{th}$ of [(pole pitch)/(number of poles)] per minute; but if external forces are of sufficient amplitude, the consideration of this minimum value is higher.

Running such a device in "velocity loop" would require a "high speed" force regulator and would provide constant "relative" trending velocity but not a resultant constant displacement rate, because any Proportional, Integral and Differential ("PID") control algorithm relies on velocity feedback. In other words, error must occur before the integrator makes a correction. When the correction is made, the desired set-point space and time component and therefore coordination with the targeted application is not maintained. Running such a device in "force loop" would control force but would not operate in the requested constant velocity as external forces would result in a velocity change, as the integrator still would rely on the velocity feedback information, which is undesirable. The present invention provides a solution to all the above discussed problems associated with these types of controls.

Figure 2:
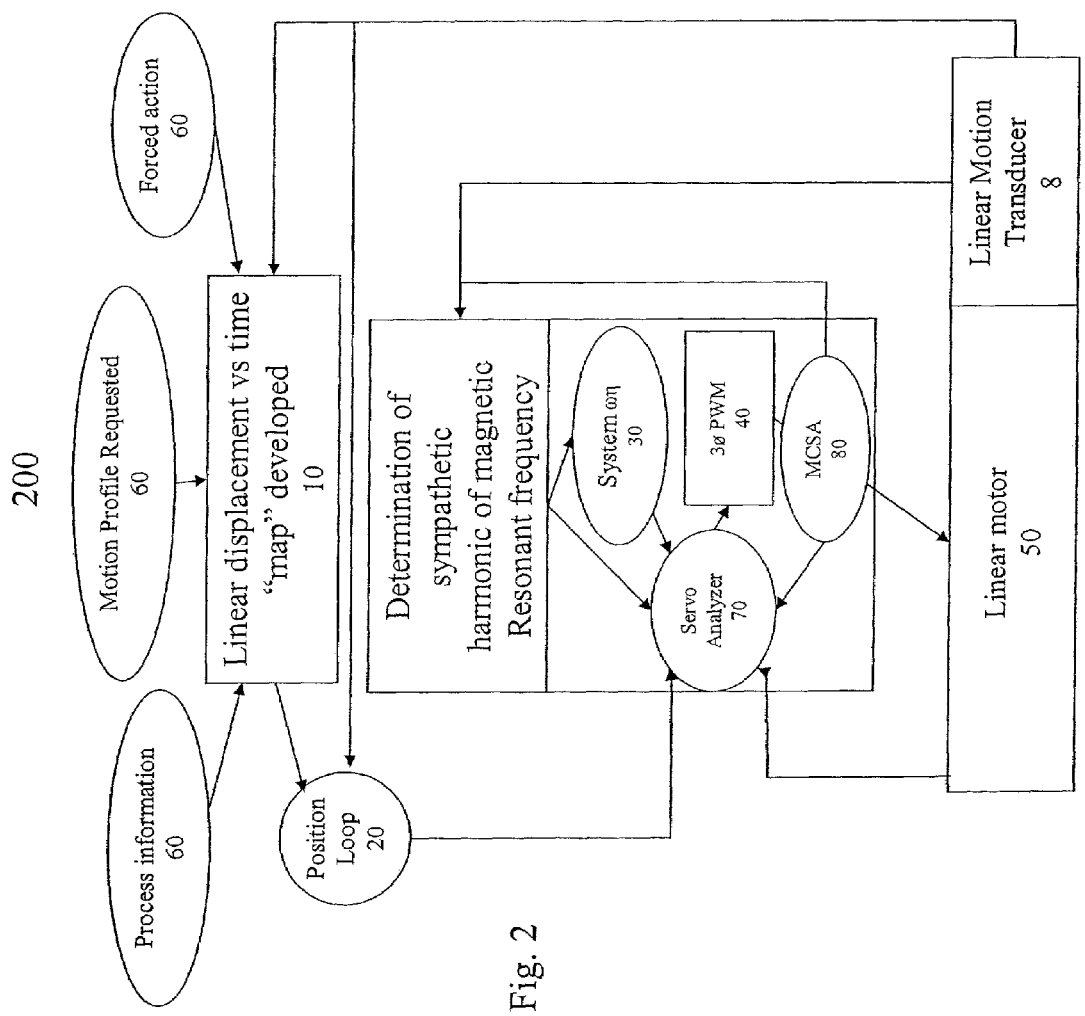
FIG. 2 is a flow chart showing a control program, according to one aspect of the present invention.

One embodiment of the present invention is a control program 200 that controls the motion of the device 100 described above. This is achieved with a feed forward position targeted PID control algorithm 200, as shown in FIG. 2. The user would select a desired velocity set-point 60 for the application based on the process information, motion profile desired and a force action desired by the user. A time and space feed forward "geometric displacement map" 10, which is also called the feed forward velocity map 10, is computed within the controller based on the information inputted. The motivator 50 is driven to satisfy the command of this "mapped" geometric displacement vs. time set-point 60. Carriage mounted position transducer 8 information is compared to the "geometric displacement map" 10 and the process output is controlled in a position loop 20 numerical comparator fashion via signals received from a servo analyzer 70 that compares the two values. The servo analyzer 70 in turn receives signals from the Motor Current Signature Analysis ("MCSA") 80, which constantly monitors the current in the motor 50. This will ensure that the actual resulting velocity is the same as the "mapped" command velocity that the user desired.

As carrier frequencies increase and/or the rate of motion profile corrections increase, high values of system ωη 30 integration are required for smooth consistent motion at low velocities. The root mean square ("RMS") current flow also increases in mutual response to the motion profile error corrections. This causes undesirable effects such as -heating of the stator winding. To minimize the amount of current applied during the correction phase of operation, this current is applied at a pulse width modulated ("PWM") frequency 40 that is either of the same base, octaval root or sympathetic harmonic of the magnetic resonance properties of the motivator. necessary to consider the material and geometric properties of the motor itself when selecting the carrier and integrator frequencies. As motor conditions change, (temperature, air gap dimension, electrical resistance) the controller must change the modulation frequency in concert with the changes in real time.

Accordingly, the linear traversing carriage disclosed herein can be utilized in various devices that require a traversing mechanism. Such devices include, in wet end and dry end tailcutters on a papermaking machine using water or a rotary knife or conventional knife for cutting the fabric, traversing dust doctors, traversing doctor systems using a short blade that is controlled to clean specific areas of a roll surface, traversing measurement systems e.g. to measure the coating thickness on a Yankee surface, traversing brush doctors for a dryer application; which instead of being full width can be used with a shorter brush that would traverse across the roll surface of the belt, or in traversing sheet cutters for a reel turn-up device.

Thus, while fundamental novel features of the invention are shown and described and pointed out, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in another form or embodiment. It is the intention, therefore, to be limited only as indicated by the scope of the claims appended hereto.

The invention claimed is:

1. A linear traversing device comprising:
   an inductor type linear motor comprising an electrical stator winding;
   a conductive platen extending over an entire traverse length of the device;
   a ferromagnetic material affixed to said conductive platen;
   a support means for supporting the device and maintaining an air-gap between the stator winding and the conductive platen;
   a user selected feed forward geometric velocity map for driving the device,
   a controller that controls a movement of the device according to the user selected feed forward velocity map.

2. The linear traversing device according to claim 1, wherein the controller is a numeric comparator control algorithm for movement of the device.

3. The linear traversing device according to claim 1, wherein a velocity of the device is controllable.

4. The linear traversing device according to claim 1, wherein a direction of movement of the device is controllable.

5. The linear traversing device according to claim 1, wherein a position of the device is defined by the user selected feed forward geometric velocity map to minimize excessive heating of said stator winding.

6. The linear traversing device according to claim 1, wherein the stator winding is powered at a user selected Pulse Width Modulated ("PWM") AC electrical power signal.

7. The linear traversing device according to claim 6, wherein said PWM AC electrical power signal is a selected sympathetic harmonic of a system magnetic resonance frequency in real time.

8. The linear traversing device according to claim 1, wherein the conductive platen has a continuous electrical path over the entire traverse length.

9. The linear traversing device according to claim 1, wherein the conductive platen has high electrical conductivity.

10. The linear traversing device according to claim 1, wherein the conductive platen is shaped to maximize a magnetic field developed in a transverse direction.

\* \* \* \* \*